(12) United States Patent
Simonson

(10) Patent No.: US 6,706,178 B2
(45) Date of Patent: Mar. 16, 2004

(54) MAGNETIC FILTER AND MAGNETIC FILTERING ASSEMBLY

(76) Inventor: Roger M. Simonson, 704 Strathcona Dr. SW., Calgary AB (CA), T3H 1N1

( * ) Notice: Subject to any disclaimer, the term of this patent is extended or adjusted under 35 U.S.C. 154(b) by 0 days.

(21) Appl. No.: 09/764,053

(22) Filed: Jan. 19, 2001

(65) Prior Publication Data

US 2002/0096464 A1 Jul. 25, 2002

(51) Int. Cl.[7] .............................................. B01D 35/06
(52) U.S. Cl. ...................................... 210/222; 210/223
(58) Field of Search ................................ 210/222, 223, 210/695

(56) References Cited

U.S. PATENT DOCUMENTS

| | | | | |
|---|---|---|---|---|
| 4,026,805 A | * | 5/1977 | Fowler | 210/223 |
| 4,176,065 A | * | 11/1979 | Cook | 210/223 |
| 4,450,075 A | * | 5/1984 | Krow | 210/223 |
| 4,883,591 A | * | 11/1989 | Belasco | 210/222 |
| 6,143,171 A | * | 11/2000 | Van Aarsen | 210/222 |

* cited by examiner

Primary Examiner—David A. Reifsnyder

(57) ABSTRACT

A reusable magnetic device for the extraction of ferrous particles from a body of fluid, wherein the device comprises a plurality of magnets and soft ferrous metal spacers arranged in an alternating sequence to form a stack, adjacent magnets being arranged with like poles facing, a non-magnetic and non-ferrous end piece terminally disposed at a first end of the stack, and a non-magnetic housing that contains the magnets, the spacers and the end piece. The magnetic device can be installed in a vessel to provide a fluid filtering assembly.

21 Claims, 4 Drawing Sheets

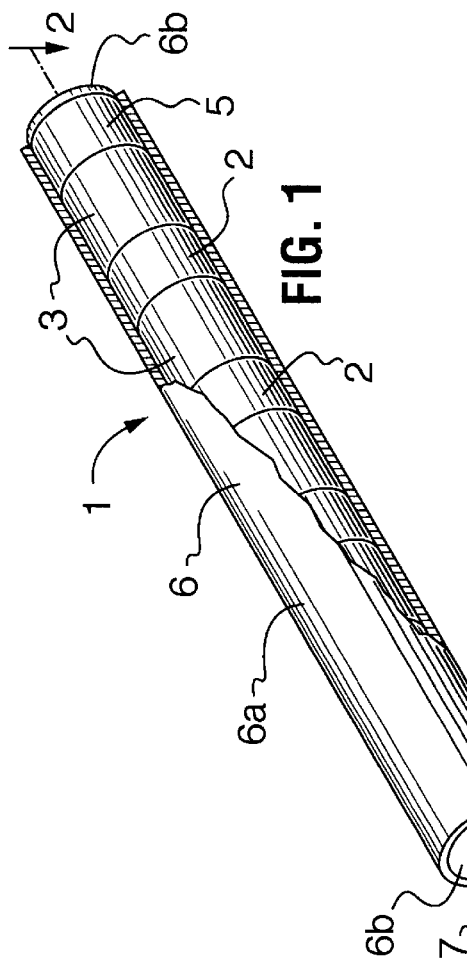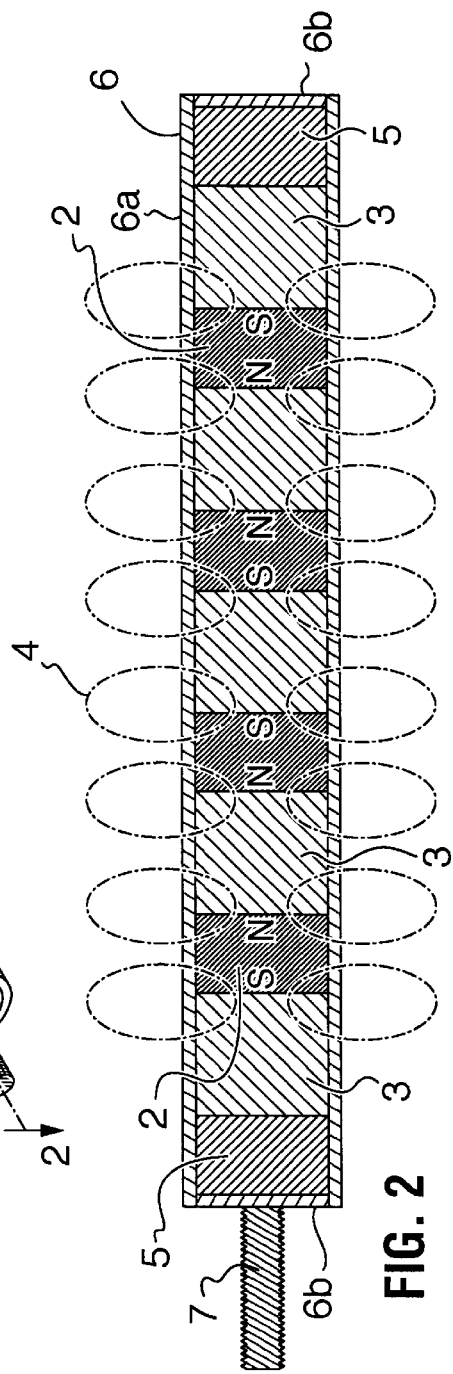

MAGNETIC FILTER AND MAGNETIC FILTERING ASSEMBLY

FIELD OF THE INVENTION

The invention relates to a magnetic device for extracting ferrous particles from a body of fluid. More particularly, the present invention is directed to a high strength magnetic device that is suitable for use within a housing, conduit or the like through which fluids flow. The invention also relates to an assembly utilizing the magnetic device for the extraction of ferrous particles from a body of fluid.

BACKGROUND OF THE INVENTION

In industry, it is frequently necessary to remove ferrous particulate contaminants from liquids, such as, for example, lubricating oils, coolant fluids, water, fuels, pump fluids and hydraulic fluids. The use of magnets for this purpose has long been recognized. Attempts have been made to provide a device in which a rod-type magnetic assembly is placed within a cylindrical vessel through which fluid flows, including the devices disclosed in U.S. Pat. Nos. 4,026,805; 4,176,065, 4,450,075; and 4,883,591. These devices operate on the principle that ferrous particles adhere to the magnetic assembly by magnetic attraction and are thereby isolated from the body of fluid.

The devices indicated above, and other similar devices, however, collectively present a number of drawbacks. For example, they may utilize low strength magnets, may not offer ease of cleaning, or may be constructed of non-ferrous metal that may allow a dangerous electrical build-up and transfer. In addition, none of the previously disclosed devices are suitable for use with gearbox applications, as they generate a magnetic field around the entire magnetic device including one from the tip resulting in the magnetization of the ferrous gear or shaft and trapping of ferrous contaminants thereon.

Previous assemblies that employ magnetic rods for fluid treatment often include screens, baffles or rings so that there is a resultant restriction to fluid flow. These assemblies require complex bypass systems including pressure release valves. Furthermore, many previous devices result in essentially laminar flow of fluid along the length of the magnetic rod such that filtration of the fluid is inefficient. Finally, some of the previously disclosed devices are designed for specific uses and as such are not adaptable to a variety of systems for which extraction of ferrous particulate contaminants is desired.

SUMMARY OF THE INVENTION

The present invention provides a reusable high strength magnetic device for the removal of ferrous particulate contaminants from a body of fluid. The device can be removably installed within the interior of a wide variety of fluid containing systems, such as, for example oil filters, fuel reservoirs, hydraulic pumps, gearboxes, and gas lines. The device is easy to clean and is resistant to corrosion. The magnetic device creates a magnetic field radially about it but does not generate a magnetic field about its long axis, beyond at least one end of the device.

Further, the invention provides a magnetic filter assembly that results in turbulent flow of fluid around the magnetic device such that the fluid is forced to come in full contact with the magnetic field resulting in full filtration of the ferrous contaminants. In one embodiment, the assembly generates a spiral fluid flow path. The spiral flow offers a reasonably long flow path in a compact device. In addition, the assembly has an internal cross sectional area that tends not to restrict the flow path of the fluid or require bypass systems including pressure release valves.

Accordingly, a broad aspect of the present invention provides a reusable magnetic device for the extraction of ferrous particles from a body of fluid, wherein the device comprises a plurality of magnets and soft ferrous metal spacers arranged in an alternating sequence to form a stack, adjacent magnets being arranged with like poles facing, a non-magnetic and non-ferrous end piece terminally disposed at a first end of the stack, and a non-magnetic housing that contains the magnets, the spacers and the end piece.

In accordance with another broad aspect of the invention there is provided a reusable magnetic device for the extraction of ferrous particles from a body of fluid, wherein the device comprises a plurality of magnets and soft ferrous metal spacers arranged in an alternating sequence to form a stack, adjacent magnets being arranged with like poles facing, a non-magnetic and non-ferrous end piece terminally disposed at a first end of the stack and a non-magnetic housing that contains the magnets, the spacers and the end piece, the end piece being selected such that a magnetic field is not present at the terminal tip of housing adjacent the end piece, and means for removeably attaching the rod inside a vessel containing the body of fluid on the housing at a second end opposite the first end.

In accordance with yet another broad aspect of the invention, there is provided a magnetic filter assembly for the extraction of ferrous particles from a body of fluid comprising a magnetic rod including a plurality of magnets and soft ferrous metal spacers arranged in an alternating sequence to form a stack, adjacent magnets being arranged with like poles facing, a non-magnetic and non-ferrous end piece terminally disposed at a first end of the stack, and a non-magnetic housing that contains the magnets, the spacers and the end piece, the end piece being selected such that a magnetic field is not present at the terminal tip of housing adjacent the end piece; and a cylindrical vessel within which the magnetic rod is removeably mounted, the vessel having fluid inlet adjacent its first end and a fluid outlet adjacent its second end.

BRIEF DESCRIPTION OF THE DRAWINGS

The invention will now be described, by way of example only, reference being made to the accompanying drawings in which:

FIG. 1 is a perspective view of a magnetic device according to the present invention with the housing partially cut away to expose the magnets.

FIG. 2 is a sectional view along line 2—2 of FIG. 1.

DETAILED DESCRIPTION OF THE INVENTION

Figure 3:
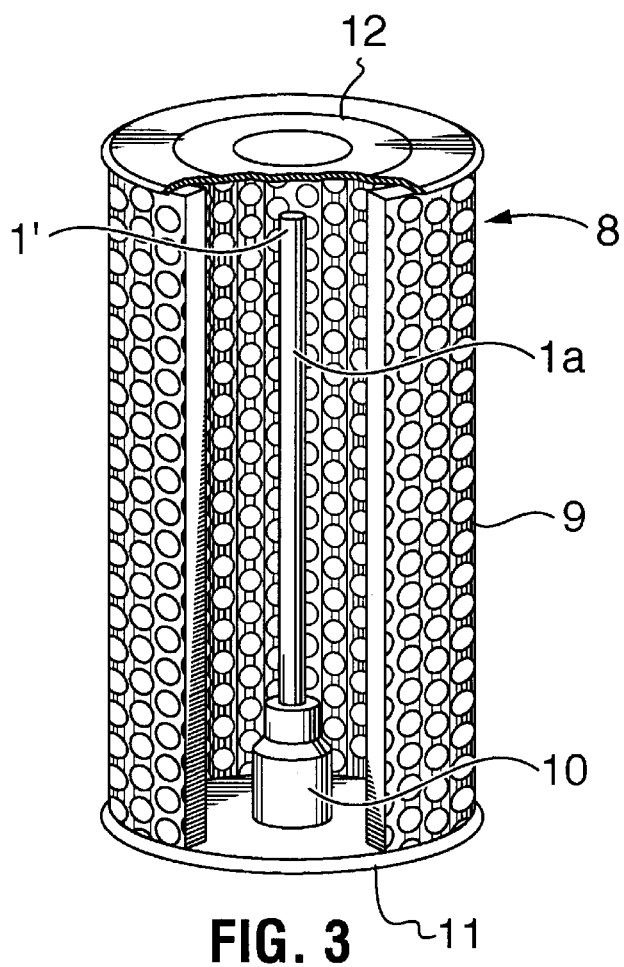
FIG. 3 is a perspective view of a magnetic device according to the present invention wherein the device is in operative position within a fluid filter.

Referring to FIGS. 1 and 2 there is illustrated a magnetic device 1 in accordance with an embodiment of the present invention wherein a relatively high magnetic field is obtained by utilizing a stack of strong disc magnets 2 and soft metal disc spacers 3. The stack of magnets and spacers are arranged in alternating positions along the length of the stack with a spacer positioned between each adjacent set of magnets in series. The magnets each are positioned with like poles facing each other through the intervening spacers. Preferably, a spacer is positioned at each end of the stack. The spacers can have approximately the same diameter as the magnets to facilitate stacking. In this arrangement, magnetic fields 4 generated from adjacent like poles confront each other at the middle of the intervening spacer thereby creating longitudinally compressed magnetic fields of increased penetration. The stack may be comprised of any number of magnets and spacers.

While any type of magnet may be used, it is preferred that rare-earth magnets are used to maximize the magnetic force of the assembly. For most applications, a vibration resistant, high heat, rare-earth magnet is preferred such as, for example, a neodymium boron magnet.

It is required that the spacers are made of ferrous materials in order that the spacer extends the magnetic field surface area and assists in redirecting the fields. Although the spacers may be of a variety of soft ferrous metal constructions, the use of cold rolled iron is preferred. Cold rolled iron provides low resistance to the magnetic field while also being highly magnetic.

While a cylindrical magnet/spacer shape is preferred for strength and ease of handling, it will be appreciated that shape of the spacers and magnets may vary from that described here. The use of components of solid construction, however, provides for the greatest field strength.

To substantially reduce the magnetic fields at an end of the device, a non-ferrous end-piece is attached at one end of the stack. In this manner, the device may be easily cleaned of adhering particles by simply wiping any particles magnetically attached thereto to the end of the device from which they will fall off. The end-piece can be of a variety of materials including wood, copper and plastic. Preferably, the end piece is shaped similarly to the magnets to facilitate assembly. If it is desirable that both ends be without magnetic field, an end-piece can be placed at both ends of the stack, as shown.

The stack of magnets 2, spacers 3 and end-piece 5 are contained within a housing 6. Housing 6 is formed of a non-magnetic material resistant to damage in the environment in which the magnetic device is to be used. A particularly useful material for forming the housing is stainless steel since it is resistant to both corrosion and impact damage in many environments. In addition, because of the strength of stainless steel the housing can be very thin-walled. Thereby reducing interference with the magnetic fields.

Housing 6 in the illustrated embodiment includes a sidewall 6a and a pair of end plugs 6b. The sidewall is formed of, for example, stainless steel tubing and the end plugs are welded into place.

End plugs 6b can also be secured by other means such as adhesives or snap rings. Of course, the housing can be constructed of other materials such as plastics, as previously noted.

Housing 6 can be any shape and size. Preferably, housing 6 closely surrounds the magnets. It has been found that a cylindrical form is most useful as it works best with fluid flow therepast.

To reduce damage both to the housing and to the magnets by vibration, preferably the magnets 2, spacers 3 and end pieces 5 are secured together by adhesive. In addition, adhesive can be applied between the internal parts 2, 3 and 5 and housing 6.

As the device will be utilized within a fluid containing apparatus, attachment means for securing the device to such an apparatus is provided. The attachment means may vary depending on the application, and can include, for example, a threaded rod 7 for engagement into a threaded aperture or fastener or a magnet for magnetic attachment to apparatus constructed of ferrous materials. In any case, the attachment means is firmly attached to one end of the magnetic device, such as, for example, by welding, or adhesive attachment to housing 6.

Figure 4:
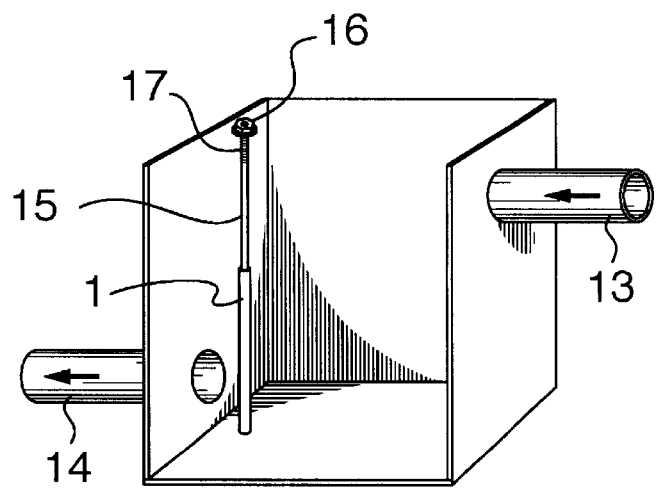
FIG. 4 is a perspective view of a magnetic device according to the present invention wherein the device is in operative position within a fluid reservoir.

FIGS. 3 and 4 exemplify the use of the magnetic device within different types of fluid containing apparatus. FIG. 3 shows a magnetic device 1a according to the present invention within the core of a fluid filter 8, such as an oil filter. In this case, device 1a includes a magnetic base 10, including a strong magnet secured within a cavity, attached at one end of the housing to secure the device by magnetic attraction to the metal bottom 11 of the filter. In this example, fluid flows into the core of the filter from the top of the filter and out through the barrier filtration media 9. To maximize the efficiency of the magnetic filtration, the magnetic device is centrally located within the core. Because the magnetic filter removes ferrous contaminants before they encounter the barrier filter, the barrier filter does not become clogged with such contaminants and therefore the usefulness of the barrier filter is increased. Furthermore, while the barrier filter may not retain particles below a certain size, the magnetic filtration is not size-dependent. The overall efficiency of the filtration system is therefore greatly improved with use of the magnetic filter.

Having a magnetic attachment to the filter, magnetic device 1a can be removed, cleaned and installed in another or same filter. Wiping accumulated debris to end 1' opposite magnetic base 10 cleans the device. End 1', having a copper end-piece therein, does not have a magnetic field associated therewith. At end 1' any debris can be wiped off easily without having to overcome magnetic attractive forces.

FIG. 4 demonstrates the placement of a magnetic device 1 according to the present invention within a fluid reservoir 13. In this case, device 1 is placed directly in front of the fluid outlet 14 of the reservoir so as to magnetically attract particles flowing past the device and into outlet 14. The device is secured, by threaded connection, to an elongate rod 15. The rod can be any desired length suitable to position device 1 in a selected location within a reservoir. Rod 15 and device 1 are inserted through a port in the reservoir wall. A bolt 16 is attached to a threaded portion 17 on the rod to secure the rod and the device within the reservoir. Of course, to avoid the use of an extension rod, magnetic device 1 could have been elongated. However, this would increase cost.

Figure 5:
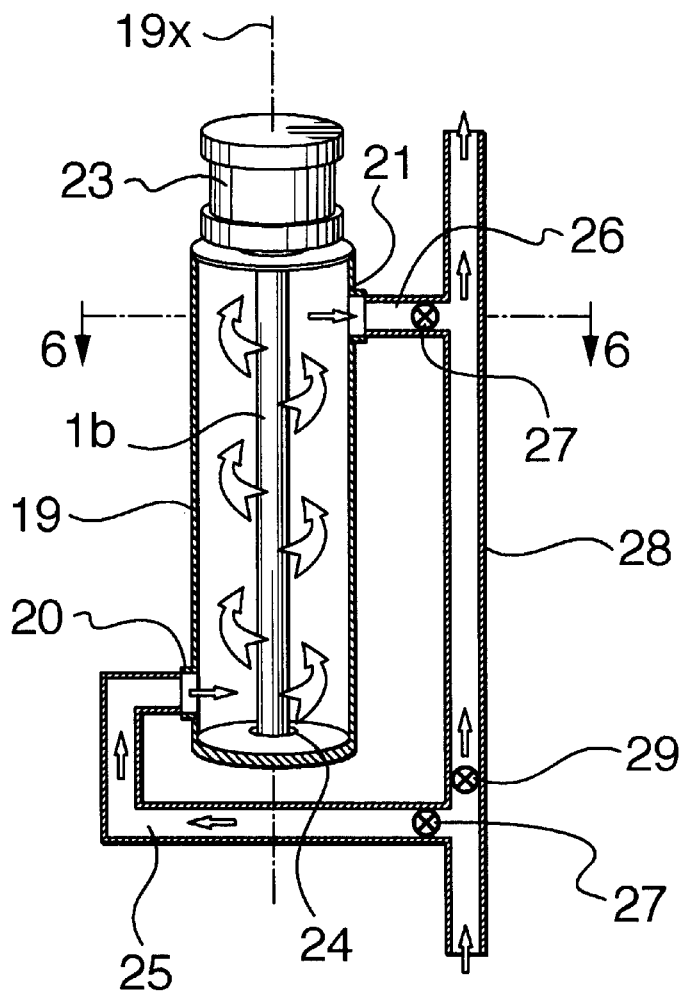
FIG. 5 is a perspective view, partially in section of a magnetic filter assembly according to the present invention.
Figure 6:
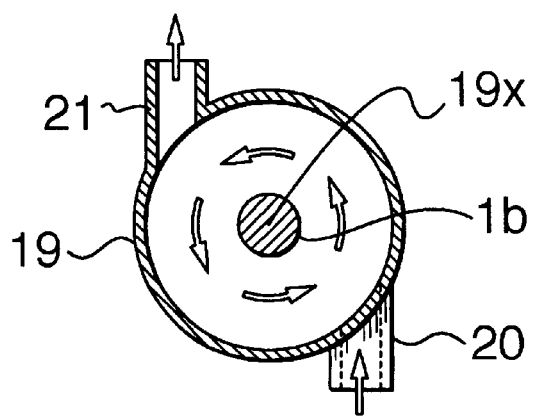
FIG. 6 is a sectional view along line 6—6 of FIG. 5.

Referring to FIGS. 5 and 6 there is illustrated a magnetic filtering assembly. The assembly includes a cylindrical vessel 19 in which a magnetic rod 1b, such as that described above, is positioned. The vessel can be formed of any material resistant to damage by the fluids to be passed therethrough. Common materials are aluminum, stainless steel and plastics. The vessel has an inlet 20 and an outlet 21 connected to sidewall portions of the vessel and positioned to be offset from the central axis 19x of the vessel. The inlet is positioned near the bottom of the vessel and the outlet is positioned near the top of the vessel. Fluid enters the vessel though the inlet and is deflected by the vessel sidewall and the magnetic rod to flow in a spiral fashion through the vessel. As the fluid travels upwards through the vessel towards the outlet, it continues to flow in a spiral around the rod until it leaves the vessel through the outlet. This circular flow of the fluid around the rod creates turbulence in the fluid flow and effectively increases the path length by which fluid is required to travel through the vessel and past the rod as compared to previous filtering assemblies wherein laminar flow of fluid was common. Consequently, the efficiency of the magnetic filtration is increased.

Preferably, rod 1b is positioned generally concentrically within the vessel. To provide for easy removal and replacement of the rod for cleaning, the rod is secured to a removable cap 23. The cap can be secured to the vessel by threaded engagement or other means such as quick couplers. To remove the rod, the cap is removed and the rod being attached to the cap is removed with the cap. The rod is stabilized within the vessel by insertion into an indentation 24 in the lower end of the vessel.

In use, vessel 19 is connected into a fluid flow conduit between a supply pipe 25 and an exit pipe 26. To permit removal or opening of the vessel, valves 27 are provided in the supply pipe and the exit pipe to shut off the flow of fluid. To provide for taking the vessel off line while the fluid continues to flow through the fluid flow conduit, preferably a bypass pipe 28 is installed between supply pipe 25 and exit pipe 26. Valve 29 controls the flow of fluid through bypass pipe 28.

Inlet 20 is selected to have a cross sectional area about equal to or greater than the cross sectional area of the supply pipe connected to the inlet, such that there is no restriction to fluid flow into the vessel. In addition, there is no restriction to flow through the vessel. Preferably, outlet 21 has a cross sectional area about equal to or greater than the cross section area of the inlet.

Figure 7:
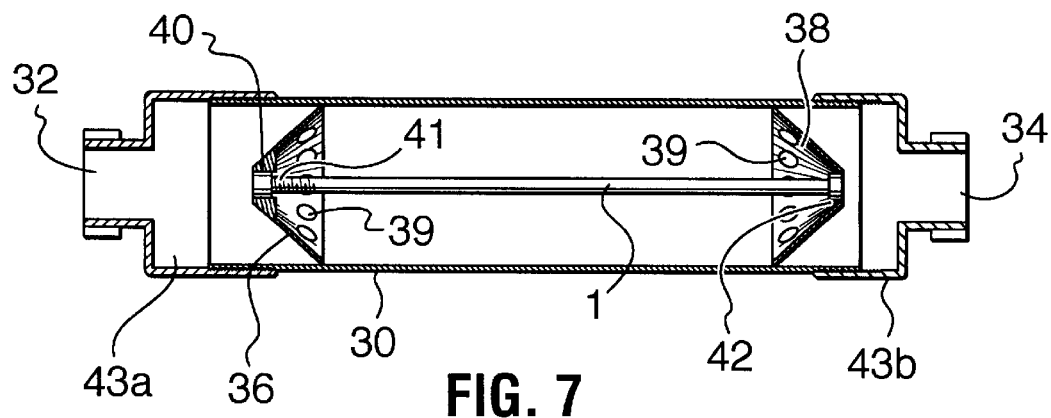
FIG. 7 is a sectional view through another magnetic filter assembly according to the present invention.

Another magnetic filtering assembly according to the present invention is shown in FIG. 7. The assembly includes a vessel 30 and a magnetic rod 1 similar to that described in FIG. 1. The vessel includes an inlet 32 at its first end and an outlet 34 at its opposite end. Each of the inlet and outlet include a quick coupler for easy connection into a fluid flow conduit. A first baffle 36 is mounted within the vessel adjacent the inlet and a second baffle 38 is connected adjacent the outlet. Baffles 36, 38 are generally conical including apertures 39 formed therethough. Baffles 39 tend to create turbulence in fluid flowing therepast and increases the amount of fluid passing through the strong magnetic field generated close to rod 1. The total open area of the apertures on each baffle are about equal to or greater than the cross sectional area of the inlet, such that no resistance to flow is created by passing through the baffle.

Baffle 36 includes a central threaded aperture 40 though which rod 1 is passed and engaged by threaded portion 41 on an end of the rod. Rod 1 is stabilized by insertion into an indentation 42 at the center of baffle 38.

To access rod 1 for cleaning vessel includes a threaded cap 43a at one end. To facilitate assembly, a cap 43b can form the opposite end of the vessel and be secured by welding, threaded engagment or other means. Magnetic filtering assemblies according to the present invention can be installed in-line for a variety of applications.

Figure 8:
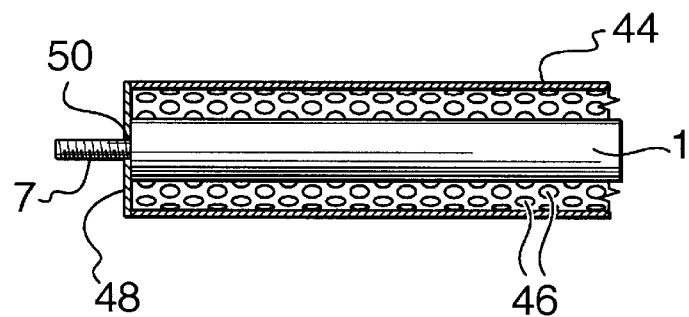
FIG. 8 is a perspective view, partially cut away of another magnetic device according to the present invention.

With reference to FIG. 8, because of the strong magnets in a device 1 according to the present invention, the device can sometimes be magnetically attracted to various parts of a ferrous tank in which it is positioned. This can inhibit placement to and removal of the device from the tank. Therefore, in one embodiment, a spacing sleeve 44 is positioned around the device. The sleeve has large openings 46 to permit flow of fluid therethrough and into contact with device 1. However, sleeve 44 is formed of a rigid, non-magnetic material such as plastic or stainless steel and maintains spacing between surrounding surfaces and the device so that strong magnetic attraction therebetween cannot be established. Sleeve 44 can be secured to the rod in any desired way. In the illustrated embodiment, sleeve 44 includes an end wall 48 with a centrally located aperture 50 therethrough. Aperture 50 is inserted over threaded rod 7 prior to installation of the device in a fluid container.

The embodiments of the invention in which an exclusive property or privilege is claimed are defined as follows:

1. A reusable magnetic device for the extraction of ferrous particles from a body of fluid, wherein the device comprises a plurality of magnets and soft ferrous metal spacers arranged in an alternating sequence to form a stack, adjacent magnets being arranged with like poles facing, a non-magnetic and non-ferrous end piece terminally disposed at a first end of the stack, and a non-magnetic housing that contains the magnets, the spacers and the end piece.

2. The reusable magnetic device as in claim 1, further comprising an attachment means connected to the housing for removeably installing the device within a body of fluid.

3. The reusable magnetic device as in claim 2, wherein the attachment means includes a magnetic base for installation by magnetic connection.

4. The reusable magnetic device as in claim 3, wherein the magnetic base is positioned at an end of the housing opposite the end piece.

5. The reusable magnetic device as in claim 1, further comprising a spacing sleeve disposed about the housing and having openings therethrough.

6. The reusable magnetic device as in claim 1, wherein the housing is formed of stainless steel.

7. The reusable magnetic device as in claim 1 further comprising a second non-magnetic and non-ferrous end piece terminally disposed at an end opposite the first end of the stack.

8. A reusable magnetic device for the extraction of ferrous particles from a body of fluid, wherein the device comprises a plurality of magnets and soft ferrous metal spacers arranged in an alternating sequence to form a stack, adjacent magnets being arranged with like poles facing, a non-magnetic and non-ferrous end piece terminally disposed at a first end of the stack and a non-magnetic housing that contains the magnets, the spacers and the end piece, the end piece being selected such that a magnetic field is not present at the terminal tip of housing adjacent the end piece, and means for removeably attaching the rod inside a vessel containing the body of fluid on the housing at a second end opposite the first end.

9. The reusable magnetic device as in claim 8, further comprising a spacing sleeve disposed about the housing and having openings therethrough.

10. The reusable magnetic device as in claim 8, wherein the means for removably attaching includes a magnetic base for installation by magnetic connection.

11. The reusable magnetic device as in claim 10, wherein the magnetic base is positioned at an end of the housing opposite the end piece.

12. The reusable magnetic device as in claim 8, wherein the housing is formed of stainless steel.

13. The reusable magnetic device as in claim 8 further comprising a second non-magnetic and non-ferrous end piece terminally disposed at an end opposite the first end stack.

14. A magnetic filter assembly for the extraction of ferrous particles from a body of fluid comprising a magnetic rod including a plurality of magnets and soft ferrous metal spacers arranged in an alternating sequence to form a stack, adjacent magnets being arranged with like poles facing, a non-magnetic and non-ferrous end piece terminally disposed at a first end of the stack, and a non-magnetic housing that contains the magnets, the spacers and the end piece, the end piece being selected such that a magnetic field is not present at the terminal tip of housing adjacent the end piece; and a cylindrical vessel within which the magnetic rod is removeably mounted, the vessel having fluid inlet adjacent its first end and a fluid outlet adjacent its second end.

15. The magnetic filter assembly as in claim 14 wherein the magnetic rod is mounted to a removable cap on the vessel.

16. The magnetic filter assembly as in claim 14 wherein the inlet is lower on the cylindrical vessel than the outlet.

17. The magnetic filter assembly as in claim 16 the vessel having a long axis and a sidewall and wherein the inlet is arranged such that fluid passing from the inlet into the vessel is directed away from the long axis and toward the sidewall.

18. The magnetic filter assembly as in claim 14 further comprising a baffle therein, the baffle including a plurality of apertures therethrough and the total cross sectional area of the apertures being about equal to or greater than the cross sectional area of the inlet.

19. The magnetic filter assembly of claim 18 wherein the baffle includes an opening for accepting and engaging the magnetic rod.

20. The reusable magnetic device as in claim 14, further comprising a magnetic base connected to the housing for removably mounting the magnetic rod by magnetic attachment within the cylindrical vessel.

21. The reusable magnetic device as in claim 20, wherein the magnetic base is positioned at an end of the housing opposite the end piece.

\* \* \* \* \*